United States Patent [19]
Hosoya et al.

[11] Patent Number: 5,289,568
[45] Date of Patent: Feb. 22, 1994

[54] APPARATUS AND METHOD FOR DRAWING FIGURES

[75] Inventors: Rituko Hosoya, Kamakura; Akira Nakajima, Tokyo; Toshiharu Kawasaki, Yokohama; Yasumasa Matsuda, Tokyo, all of Japan

[73] Assignee: Hitachi, Ltd., Tokyo, Japan

[21] Appl. No.: 579,532

[22] Filed: Sep. 10, 1990

[30] Foreign Application Priority Data

Sep. 18, 1989 [JP] Japan .................... 1-239951

[51] Int. Cl.$^5$ ............................................... G06F 3/14
[52] U.S. Cl. ................................. 395/135; 395/161; 395/155
[58] Field of Search ............ 395/141, 142, 139, 140, 395/155, 161, 162, 166, 135; 340/747, 750, 706

[56] References Cited

U.S. PATENT DOCUMENTS

| | | | |
|---|---|---|---|
| 4,434,467 | 2/1984 | Scott | 395/155 |
| 4,451,895 | 5/1984 | Sliwkowski | 395/155 |
| 4,881,067 | 11/1989 | Watanabe et al. | 395/141 |
| 4,882,692 | 11/1989 | Saxton et al. | 395/141 |
| 4,962,472 | 10/1990 | Seki et al. | 395/161 |

Primary Examiner—Phu K. Nguyen
Attorney, Agent, or Firm—Antonelli, Terry, Stout & Kraus

[57] ABSTRACT

An apparatus and a method for drawing figures. The apparatus includes a memory apparatus for storing part figures having drawing order judging rules whereby a target figure is drawn, a selecting apparatus for selecting part figures from the memory apparatus according to the user's instructions, and an apparatus for determining the drawing order based on the drawing order rules of a plurality of part figures that were selected from the memory apparatus. The part figures including a given figure are stored in the memory apparatus along with their respective drawing order rules. A second apparatus is provided whereby these part figures are searched for and transferred into a temporary memory area in accordance with the user's instructions. A drawing order determining apparatus determines drawing orders based on the drawing order rules of the user-selected part figures transferred into the temporary memory area. The part figures are drawn on a display unit in accordance with the drawing orders thus determined.

15 Claims, 8 Drawing Sheets

| PART FIGURE NAME — DRAWING ORDER — DRAWING POSITION — DRAWING DATA |

| FORELOCK 3 |
|---|
| 8 |
| (1.1) |
|  |

| EARRINGS 1 |
|---|
| 7.5 |
| (3.5) |
|  |

FIG. 10

APPARATUS AND METHOD FOR DRAWING FIGURES

BACKGROUND OF THE INVENTION

The present invention relates to an apparatus and a method for drawing, on a display device, target figures each constructed by a plurality of part figures including characters and images, the part figures being drawn in an optimal order thereof.

The representative prior art drawing device, such as one disclosed by Japanese Patent Laid-open No. 62-49477, illustratively draws figures such as a human face according to the typical prior art method whereby pluralities of part figures such as hair style, physiognomy, eyes, mouths and noses are prepared beforehand and are then suitably combined to draw the target image of various human faces.

In drawing the above-mentioned part figures including characters and images combined in a superimposed fashion, the prior art method fails to address specifically the order in which to draw such part figures. That is, the part figures are drawn simply in the order in which they were selected. For example, when a human face is to be drawn, a physiognomy is selected first, followed by a hair style so that the part figures representing the physiognomy and the hair style are drawn, simply in that order. In this case, part of the physiognomy is sometimes overlaid with part of the hair style. That is, the physiognomy simply because it was selected first is partially hidden by unnecessary hair style lines.

SUMMARY OF THE INVENTION

It is therefore an object of the present invention to provide an apparatus and a method for drawing each target figure by combining a plurality of the previously prepared numerous part figures thereof in an suitable order.

In achieving the foregoing and other objects of the present invention and according to one aspect thereof, there is provided a figure drawing apparatus comprising a memory means for storing part figures having drawing order rules by which to draw a target figure; a selecting and calling means for selecting and calling a plurality of the part figures from the memory means according to the user's instructions; and a means for determining the order in which to draw the called part figures as per their drawing order rules.

When suitably embodied, the present invention eliminates the need to designate a specific drawing order of a given part figure every time it is selected or to select part figures according to a particular drawing order which it takes time to establish beforehand. The invention improves the efficiency of the drawing process by allowing part figures of each target figure to be drawn in an optimum order.

DETAILED DESCRIPTION OF THE PREFERRED EMBODIMENTS

The preferred embodiment of the present invention will now be described by referring to the accompanying drawings.

Figure 1:
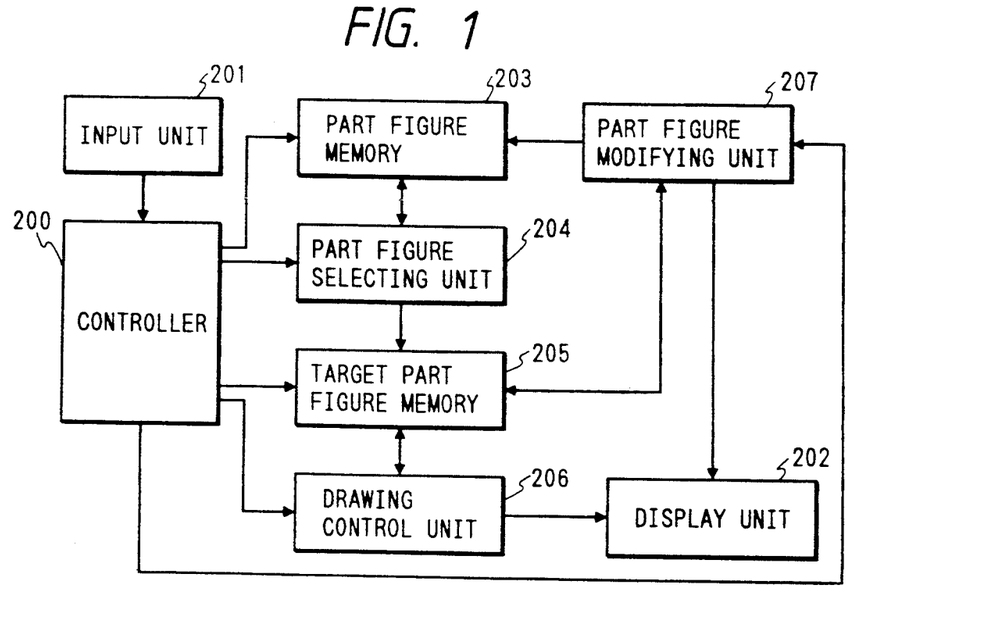
FIG. 1 is a block diagram of a embodiment of the present invention.

FIG. 1 is a block diagram that depicts the basic construction of a figure drawing apparatus, illustrating an embodiment of the invention. The apparatus comprises a controller 200, an input unit 201, a display unit 202, a part figure memory 203, a part figure selection unit 204, a target part figure memory 205, a drawing control unit 206, and a part figure modifying unit 207. The controller 200 controls the figure drawing apparatus as a whole. The input unit 201 comprises a keyboard, a mouse and a dedicated switch and is used to draw and select figures. The display unit 202 comprises a CRT, frame buffer memory and CRT controller, and is used to display figures and images. The part figure memory 203 stores data constituting part figures which are unit figures and images by which to construct a larger figure. The part figure selection unit 204 selects from among the part figures in the part figure memory 203 those part figures which are needed to draw a target figure. The target part figure memory 205 temporarily stores the selected part figures. The drawing control unit 206 draws part figures into a target figure on the display unit 202 while determining the drawing order of the part figures by comparison, the part figures being retrieved from the target part figure memory 205. The part figure modifying unit 207 modifies the contents of the part figure memory 203. The memory 205 may be either part of or separate from the memory 203.

Figure 2:
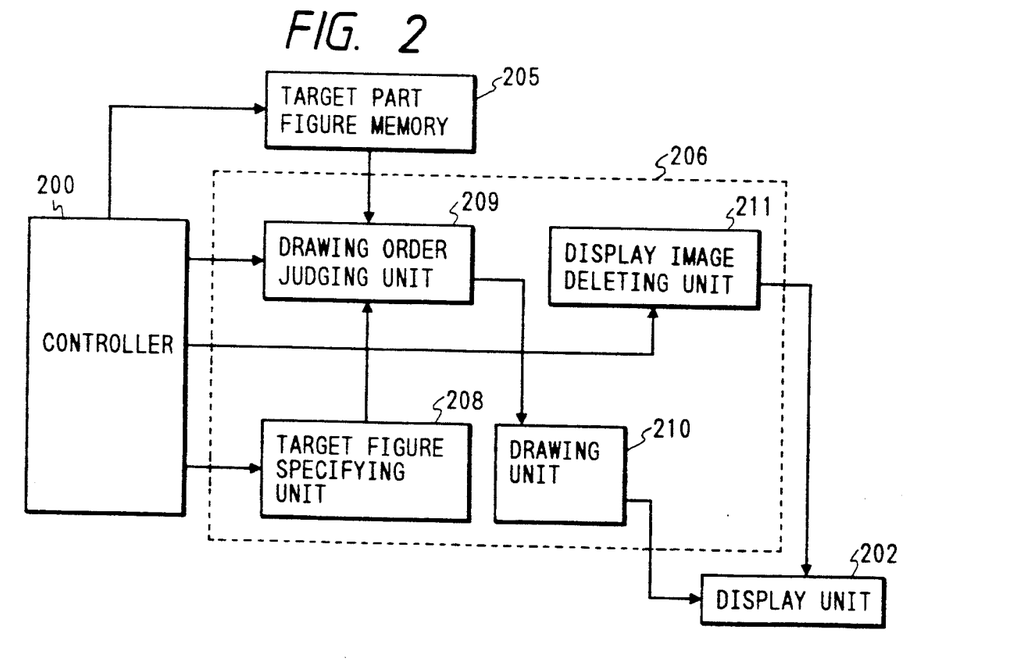
FIG. 2 is a block diagram of a drawing control unit used by the embodiment of FIG. 1.

FIG. 2 is a block diagram showing an example of the drawing control unit 206 used by the embodiment of FIG. 1. The drawing control unit 206 comprises a target figure specifying unit 208, a drawing order judging unit 209, a drawing unit 210 and a display image deleting unit 211. Where part figures (A, B, C, etc.) in the target part figure memory 205 have each a plurality of orders to be drawn in, the target figure specifying unit 208 stores data about what drawing order to use for which part figure and specifies that the drawing order data suitable for the target figure be retrieved according to the user's instructions. The drawing order judging unit 209 compares the drawing orders for a given part figure and, according to the result thereof, gives drawing instructions to the display unit 202. The drawing unit 210 draws part figures successively on the display unit 202 according to the drawing order given by the drawing order judging unit 209. The display image deleting unit 211 resets the display unit 202 to a blank screen (i.e., display screen deletion).

Figure 3:
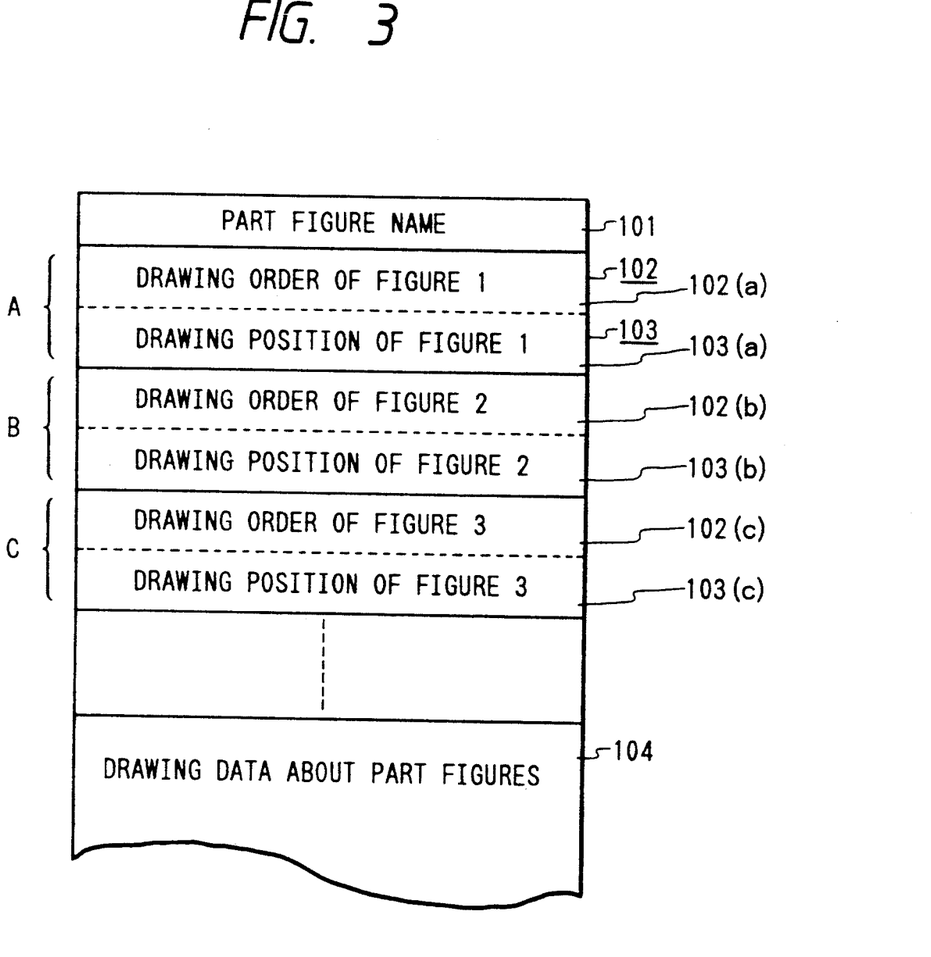
FIG. 3 is a diagram of a typical data configuration for use with the embodiment.

Referring to FIG. 3, there is illustrated a data configuration example of the part figures contained in the part figure memory 203. The part figure data includes a part figure name field 101, a drawing order field 102, a drawing position field 103 and a drawing data field 104. The part figure name field 101 contains an identification (ID) code for identifying an individual part figure. The drawing order field 102 accommodates a drawing order judging rule for each part figure by which to draw a target figure. The drawing position field 103 stores a position at which to draw each part figure on the display unit 202. The drawing data field 104 contains data about the size and shape of each part figure.

There may be a case in which it is desired to use one part figure as part of a plurality of different target figures, often with different drawing orders assigned to each part figure for drawing the respective target figures. That is, one part figure is desired to have a plurality of drawing orders. In this case, the part figure data may comprise a plurality of drawing order fields 102a, 102b, 102c, etc. for selective use depending on the target figure to be drawn, as depicted in FIG. 3.

In the example of FIG. 3, the part figure data contains data on judging rules whereby drawing orders are determined. Alternatively, each drawing order may be given the corresponding part figure name and may be stored in another memory. From that memory, each drawing order may be retrieved in conjunction with the corresponding part figure.

Figure 4:
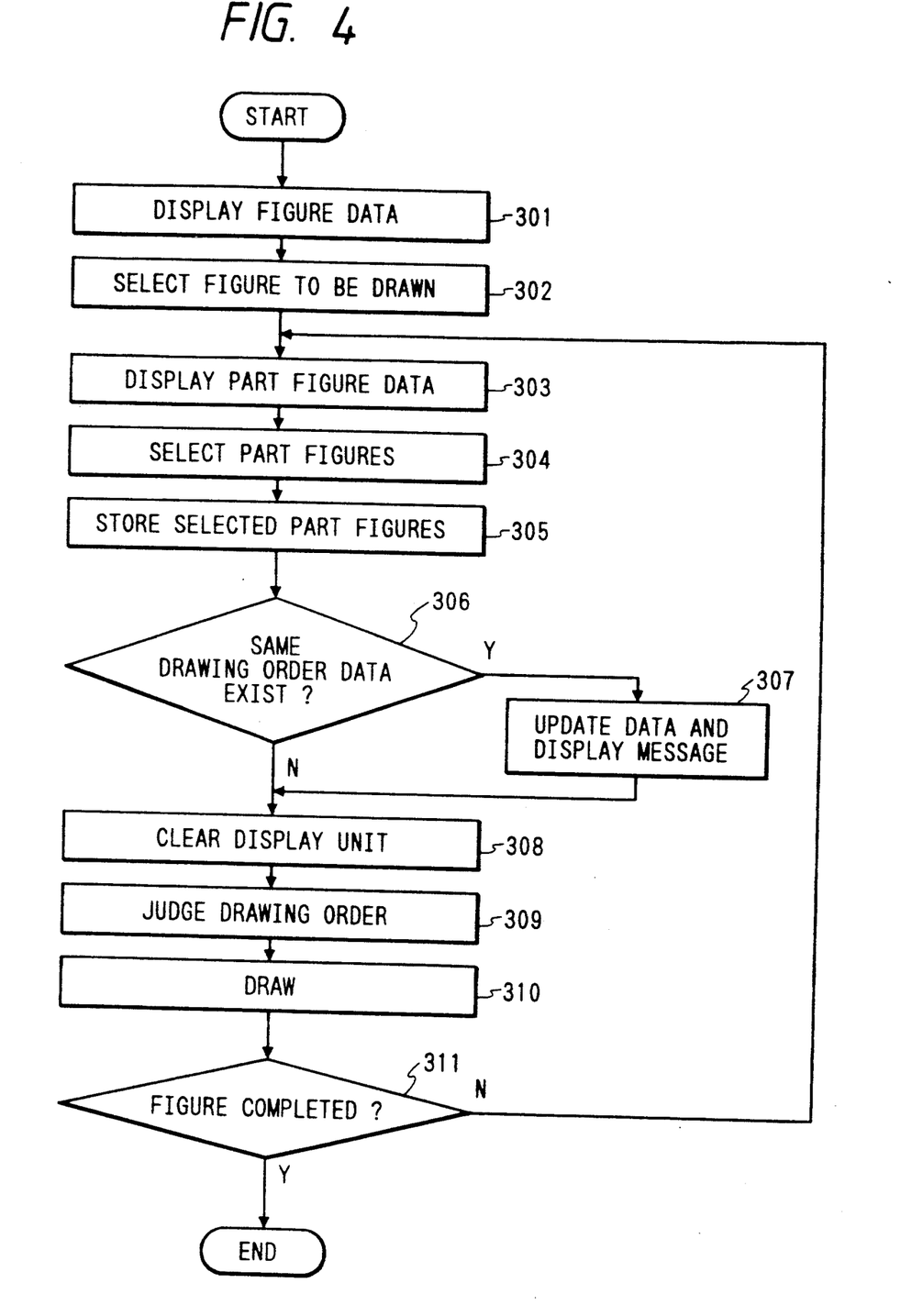
FIG. 4 is a flowchart showing how the control program of the embodiment works.

FIG. 4 illustrates in flowchart format how the control program in a ROM of the controller 200 runs in order to draw a figure. An MPU of the controller 200 controls the various components of the apparatus in accordance with the steps constituting the operation flow of the control program.

Figures 5A, 5B:
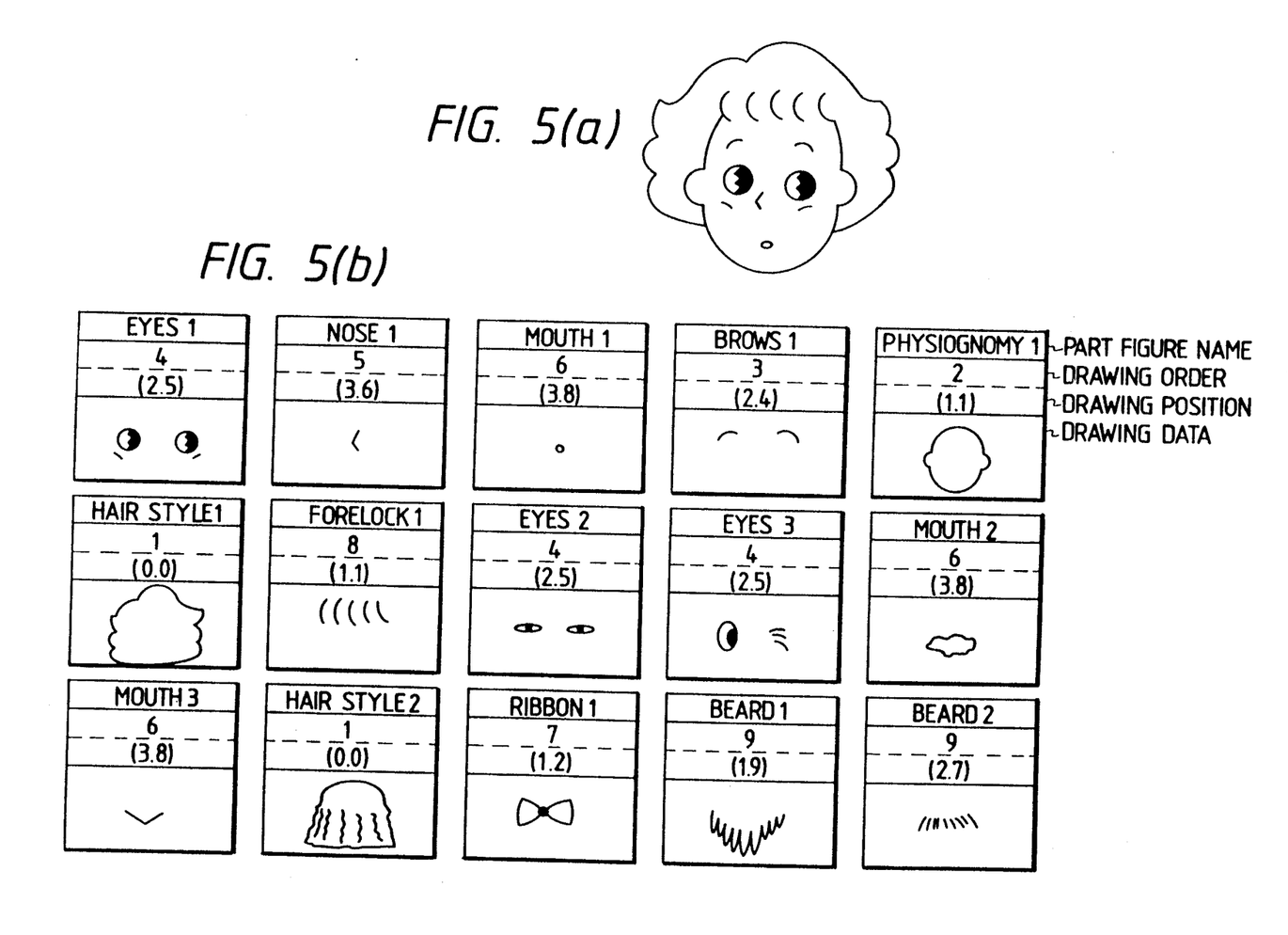
FIGS. 5(a), 5(b) and 6(a) through 6(c) are diagrams explaining the workings of the control program.

What follows is a description of the steps of FIG. 4 and the operations performed therein by use of an example in which a human face of FIG. 5 (a) is drawn using part figures such as those in FIG. 5 (b) retrieved from the part figure memory 203. The part figure data of FIG. 5 (b) represents part figures such as "eyes," "nose," "mouth," "physiognomy," "(back) hair style" and "forelock." Each part figure has one kind of drawing order judging rule data. The drawing order judging rule dictates simply that the smaller the number in the drawing order field 102, the earlier (higher) the drawing order. The drawing position is represented by coordinates relative to the top left corner of the screen on the display unit 202.

When the control program is started, a figure name stored in the target figure specifying unit 208 is displayed on the display unit 202 in step 301. The target figure specifying unit 208 contains two kinds of data: data about the kinds of figures that may be drawn using data items whose format is shown in FIG. 3, and data about the drawing orders for use with various figures. In the above example, if the target figure specifying unit 208 has only one piece of data representing "human face," then a display "HUMAN FACE" appears on the display unit 202 in step 301. If the data in the unit 208 represents a plurality of figures such as "profile" and "front face," the part figures thereof having two different drawing orders for the two figures, then there are two drawing order fields. In this case, the figure name data in the target figure specifying unit 208 indicates which of the two fields is to be selected so that the drawing order stored therein may be used. By watching the display on the unit 202, the user selects the target figure to be drawn in step 302.

In step 303, the display unit 202 displays the part figure data retrieved from the drawing data field 104 of FIG. 3 in accordance with the target figure to be drawn. In the foregoing example of the human face, the display unit 202 shows a menu comprising "eyes," "nose," "mouth," "brows," "physiognomy," "(back) hair style" and "forelock." In step 304, the user selects a part figure to be drawn. In step 305, the data about the selected part figure is read from the part figure memory 203 and written to the target part figure memory 205. In step 306, the drawing order judging unit 209 checks to see if the target part figure memory 205 already contains part figure data having the same drawing order data as that acquired in step 305. If there is no such data in the memory 205, the data is stored unchanged; if the memory 205 already contains the relevant data, step 307 is reached in which the old data is replaced by the new, and the display unit 202 gives a message stating that the part figure has been updated. In step 308, the screen deleting unit 211 in the drawing control unit 206 resets the display unit 202 to a blank screen.

In step 309, the drawing order judging unit 209 reads the rule of each selected part figure from the drawing order field 102, each part figure being constructed by the data stored in the target part figure memory 205, the rule indicating the order in which to draw each part figure making up part of the target figure. The selected part figures are compared with one another in terms of drawing order, and are sent to the drawing unit 210 in the order in which they are to be drawn. In the above example, the smaller the number in the drawing order field 102, the earlier the corresponding part figure is drawn. In step 310, the drawing unit 210 reads the received part figure data and draws the part figures successively on the display unit 202. Steps 303 through 310 are repeated to select and draw part figures, until the target figure has been completed.

Figure 6A:
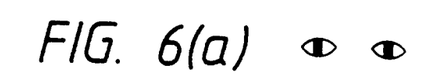
Figure 6B:
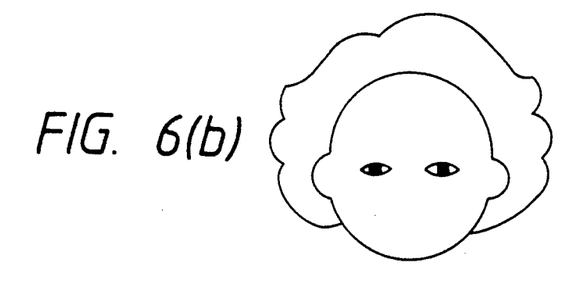

In the example above in which a human face is to be drawn, if the data representing "eyes 2" of FIG. 5 (b) is selected from the part figures displayed in step 303, the process ranging from step 303 to step 310 draws what is shown in FIG. 6 (a). When step 303 is reached a second time, another part figure, say "physiognomy 1," is selected, and the process is repeated again. When step 303 is reached a third time, another part figure, say "hair style 1" in FIG. 5 (b) is selected. At this point, the figure appearing on the display unit 202 is as shown in FIG. 6 (b). That is, in step 305, the target part figure memory 205 has received and contains the data representing three part figures, "eye 2," "physiognomy 1" and "hair style 1" of FIG. 5 (b). The drawing order fields of these three kinds of data when read out indicate that "hair style 1" is to be drawn first, followed by "hair style 1" and "eyes 2," in that order. Thus in step 309, the drawing order judging unit 209 supplies the drawing unit 210 with the data such that "hair style 1," "physiognomy 1" and "eyes 2" are drawn, in that order. The resulting display is as shown in FIG. 6 (b).

Figure 6C:
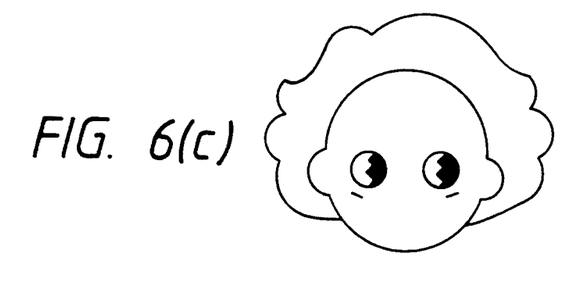

As indicated, the figure drawing apparatus according to the invention allows part figures to be drawn in suitable orders, no matter what order in which they are selected. There is no possibility of having "eyes" and/or "nose" illustratively overlaid with "physiognomy" to inadvertently make up a blank face, thus requiring modification of the drawing order. After the display of FIG. 6 (b), step 303 is again reached, and "eyes 1" is illustratively selected from among the part figures of FIG. 5 (b). This leads to step 306 in which the data "eyes 2" already in the target part figure memory 205 is replaced by the data "eyes 1." In step 310, the drawing is performed as shown in FIG. 6 (c). Thereafter, "nose 1,"

"brows 1," "forelock 1" and "mouth 1" are selected to complete the figure of FIG. 5 (a).

In the above example, a single target figure is drawn. Alternatively, a plurality of figures may be drawn likewise by dividing the target part figure memory 205 by screen and/or by the figure.

The foregoing example is the case where part figures are selected and retrieved from the part figure memory 203 to complete a target figure. Below is a description, by reference to FIGS. 7 and 8, of an example in which the user uses his or her own discretion to draw a figure or to modify the drawing order.

Figure 7:
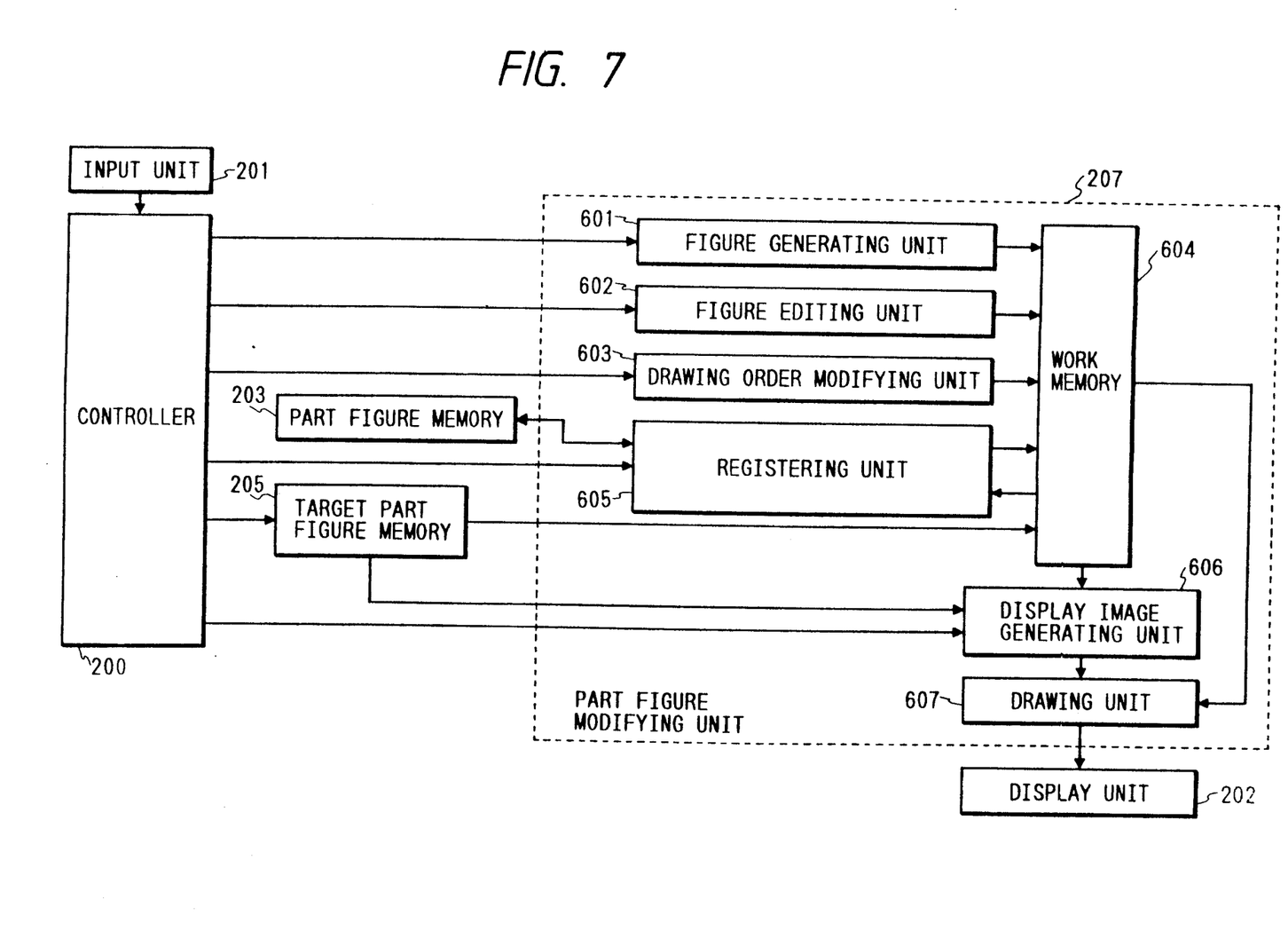
FIG. 7 is a block diagram of a part figure operation unit used in the embodiment of FIG. 1.

FIG. 7 is a block diagram describing the part figure modifying unit 207 of the embodiment in FIG. 1. The part figure modifying unit 207 comprises a figure generating unit 601, a figure editing unit 602, a drawing order modifying unit 603, a work memory 604, a registering unit 605, a display image generating unit 606 and a drawing unit 607. The figure generating unit 601 allows the user to generate desired figures. The figure editing unit 602 allows the user to edit figures. The drawing order modifying unit 603 is used to modify the orders in which to draw part figures. The work memory 604 is used to generate or edit part figures. The registering unit 605 transfers and writes to the part figure memory 203 the part figure data generated or edited in the work memory 604. The display image generating unit 606 takes the part figure data in the work memory 604 and generates therefrom the display image data to be displayed on the display unit 202. The drawing unit 607 draws the figures on the display unit 202 in accordance with the data generated by the display image generating unit 606.

Figure 8:
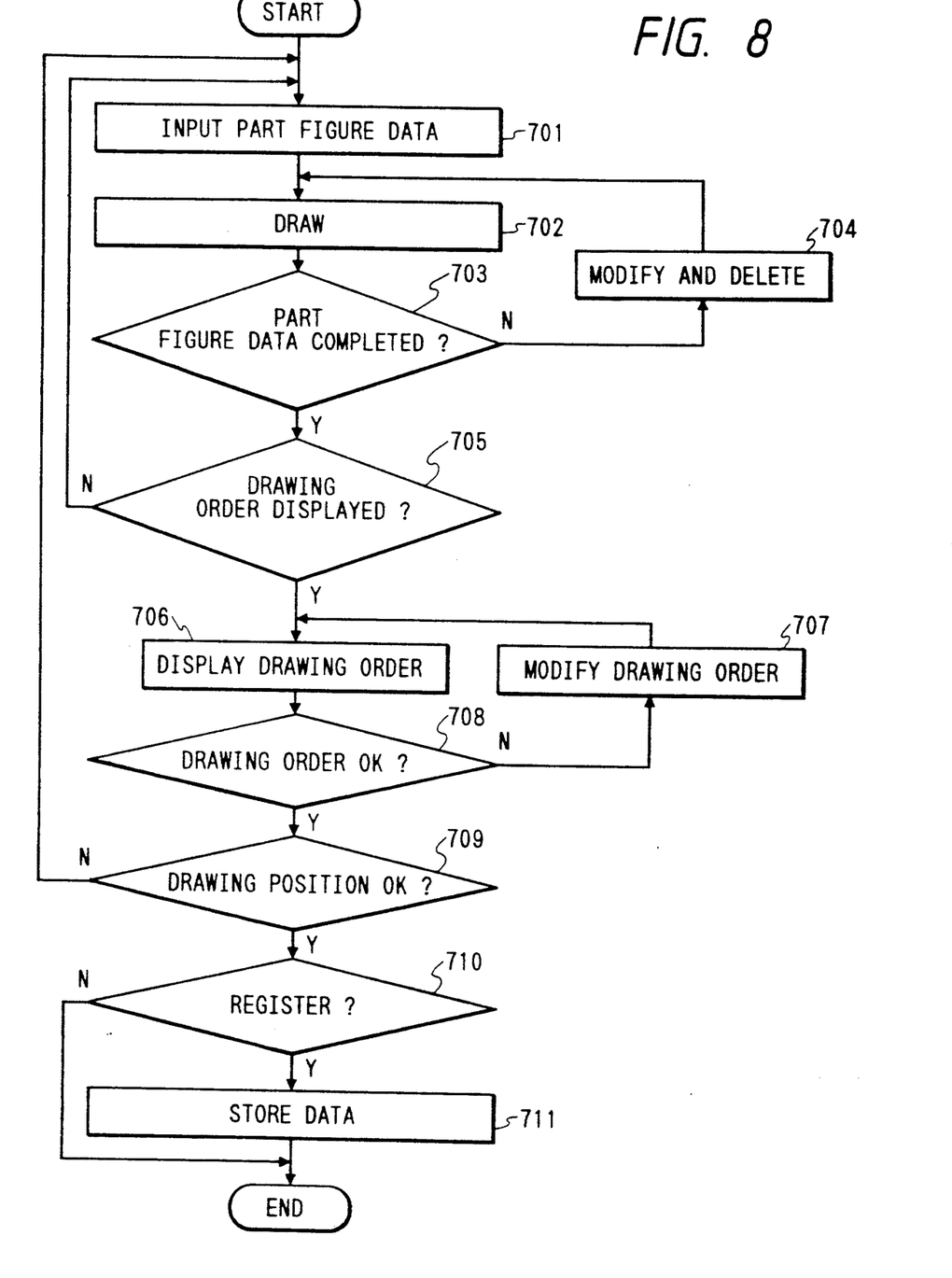
FIG. 8 is a flowchart illustrating the workings of a program that controls the part figure operation unit of FIG. 7.

FIG. 8 depicts in flowchart format the workings of the control program as it modifies or generates anew data in the part figure memory 203. Below is a description of an example in which the user makes modifications to the face of FIG. 5(a) so as to create a new face shown in FIG. 9(a). That is, the user supplements the face of FIG. (a) with a "forelock" and "earrings," and registers the data representing these additions. In this example, the part figure modifying unit 207 operates as follows:

It is assumed that the figure of FIG. 5(a) is already displayed on the display unit 202. Where new part figure data, for example, the data of FIG. 3 is to be generated, the drawing data representing the desired part figure is generated first (in drawing data field 103 of FIG. 3). The drawing data is then supplemented with such data as a part figure name, drawing order and drawing position before being registered into the part figure memory 203. In steps 701 through 704 of FIG. 8, the drawing data on each part figure is generated.

In step 701, the figure generating unit 601 generates suitable figure data in the work memory 604 according to instructions from the input unit 201. The figure data may be constructed either by dot data or by character and figure data. That is, the part generating unit 601 may be a scanner that puts pictures and photos into electronically processible format or may be a character generator that generates characters and figures. Alternatively, the drawing data included in the already generated part figure data may be read from the target part figure memory 205 into the work memory 604. In step 702, the drawing unit 607 uses the figure drawing data in the work memory 604 to draw a figure on the display unit 202. In steps 703 and 704, the user, while watching the figure on display, may change the color and shape thereof or make other modifications thereto, until the desired figure is attained.

Figure 9A:
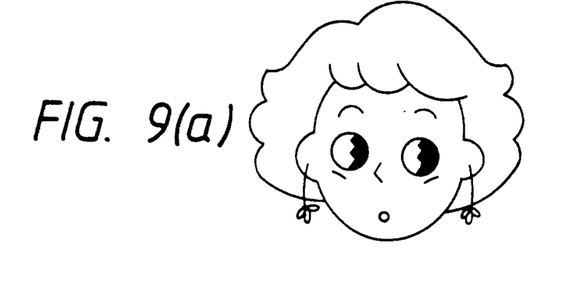
FIGS. 9(a), 9(b) and 10 are diagrams which help to explain the workings of the control program described in FIG. 8.
Figure 9B:
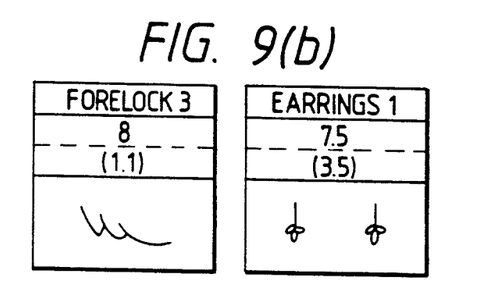

In the example of generating the figure of FIG. 9(a) based on that of FIG. 5(a), the forelock is drawn in step 701 using splines or the like. In steps 702 through 704, the figure is modified until the desired shape is attained. Alternatively, the forelock of FIG. 5(a) may be modified into what is shown in FIG. 9(a). In this case, a new part figure may be superimposed over the already drawn figure of FIG. 5(a). This makes it possible to check the size and position of the new part figure during the process. When the forelock is completed, step 701 is reached again to generate "earrings" likewise.

Figure 10:
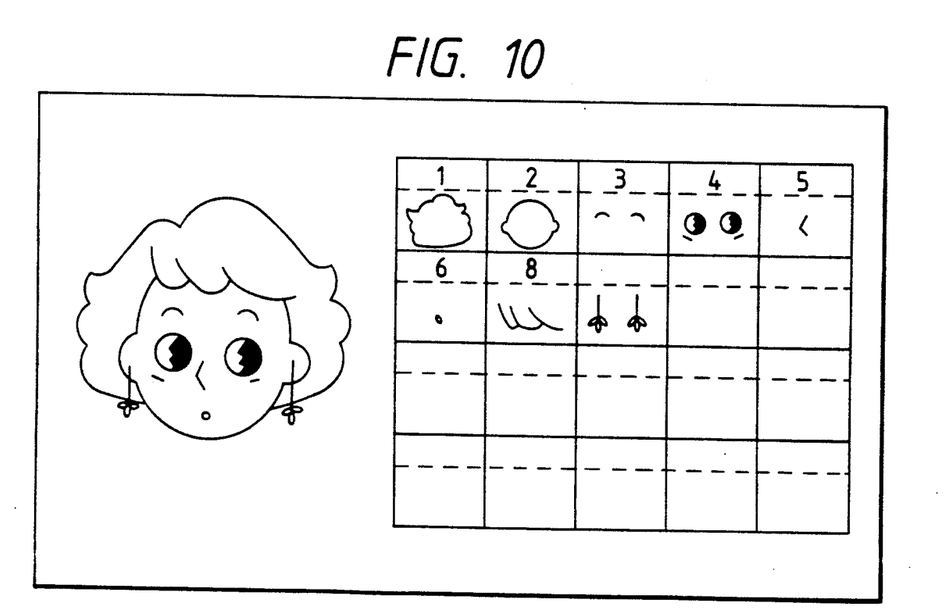

When the new part figure data is generated, the drawing order data and position data are attached thereto in steps 705 through 709. In step 705, the user is asked if drawing orders are to be displayed. If the display of the drawing orders is selected, step 706 is reached. In step 706, the display image generating unit 606 compacts the drawing data on the part figures in the target part figure memory 205 in order to generate image data in which the part figures are displayed alongside the drawing order data by the drawing unit 607. In the foregoing example in which the forelock and the earrings are generated anew, the screen of FIG. 10 is displayed. Watching this screen in step 707, the user modifies or sets the drawing order data. In FIG. 10, the modified "forelock" part figure is given the same drawing order "8" as before the modification. If the drawing order data columns are left blank, the part figures corresponding thereto are drawn in the order in which they were selected.

In step 709, the position data about the newly generated part figure is registered. With this figure drawing apparatus, the coordinates in which the part figure is drawn on the display unit 202 are simply taken as constituting the drawing position (103 in FIG. 3). Thus when the part figure is drawn wherever desired on the screen, the position thereof is registered unchanged. When the drawing data, drawing order data and drawing position data about the part figures are determined, step 711 is reached. In step 711, part figure names are given to the newly generated data according to instructions from the input unit 201, and the part figure data is stored along with its name data into the part figure memory 203.

In the manner described above, the drawing orders of part figures may be modified, and new part figures may be generated.

In the above-described embodiment, part figure data includes drawing order data indicating the orders in which the relevant part figures are drawn. Alternatively, the drawing order data may be provided as a drawing order data table within the drawing control unit 206, the data corresponding to the part figures involved. In this setup, every time a part figure is selected, the drawing order data table is referenced so that the current part figure is drawn in an appropriate order.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A figure drawing apparatus comprising:

memory means for storing a plurality of part figures to be used for drawing and overlaying order data to be used for specifying overlaying orders for drawing said part figures, each of said part figures cover portions of other part figures;

selecting means for selecting said part figures from said memory means;

a display unit for successively displaying said selected part figures; and judging and drawings means for determining an order to overlay said part figures selected by said selecting means in accordance with said overlaying order data and for successively drawing said selected part figures on said display unit, wherein said selected part figures cover said portions of said other part figures on said display unit.

2. A figure drawing apparatus according to claim 1, wherein said memory means comprises a first memory for storing said part figures, a second memory for storing said drawing orders, and a third memory for storing said selected part figures, and wherein said judging and drawing means comprises a judging unit for determining the drawing order to draw said selected part figures, a drawing unit for displaying said selected part figures in accordance with said drawing orders, and a controller for controlling said judging unit and said drawing unit.

3. A figure drawing apparatus according to claim 1, wherein said memory means comprises a first memory for storing said part figures, a second memory for storing said drawing orders, and a third memory for storing said selected part figures, said drawing order data including a plurality of data items and a plurality of drawable figure menus, and wherein said drawing means comprises a target figure specifying unit for selecting and specifying any of said drawing figure menus, a judging unit for determining the drawing orders to draw said selected part figures, a drawing control unit including a drawing unit for drawing said selected part figures on said display unit, and a controller for controlling said target figure specifying unit said judging unit and said drawing control unit.

4. A figure drawing apparatus according to claim 3, wherein said drawing control unit controls said drawing unit to draw said part figures in accordance with the drawing orders and controls said drawing unit to draw another part figures selected by said selecting means.

5. A figure drawing apparatus according to claim 4, wherein said judging and drawing means includes means for generating a display image for displaying said drawing orders.

6. A figure drawing apparatus according to claim 1, wherein said judging and drawing means comprises a rewriting unit for checking if said memory means already contain inputted drawing order data inputted by a user and, if said inputted drawing order data exists in said memory means, said rewriting unit rewriting said inputted drawing order data in said memory means;

a screen deleting unit for clearing a screen of said display unit before said selected part figures are drawn on the display unit;

a judging unit for determining an order from said drawing orders to draw said selected part figures; and a drawing unit for drawing said selected part figures on said display unit in the order determined by said judging unit.

7. A figure drawing apparatus according to claim 1, wherein said judging and drawing means comprises a rewriting unit for checking if said memory means already contains inputted drawing order data inputted by a user, and if said inputted drawing order data exists in said memory means, said rewriting unit rewriting said inputted drawing order data in said memory means;

a screen deleting unit for clearing a screen of said display unit before said selected part figures are drawn on said display unit; and a drawing unit for drawing said selected part figures on said display unit in the order determined by said judging and drawing means.

8. A figure drawing apparatus according to claim 1, wherein said figure drawing apparatus further comprises means for determining said drawing orders to be stored in said memory means, and means for modifying said drawing orders.

9. A figure drawing apparatus according to claim 1, wherein said figure drawing apparatus further comprises means for supplementing a first part figure of said part figures having a drawing order and stored in said memory means with a second part figure of said part figures having another drawing order, and for determining new drawing orders to draw said first and second part figures.

10. A figure drawing apparatus comprising:

memory means for storing drawing data corresponding to part figures, each of said part figures cover portions of other part figures;

selecting means for selectively retrieving said part figures from said memory means;

target part figure memory means for storing said part figures selected by said selecting means;

a display unit for displaying said part figures; and drawing control means including an overlaying order data table having reference data corresponding to said drawing data and corresponding to said part figures, said drawing control means selecting said part figures and determining overlaying orders from said overlaying order data table and drawing said selected part figures on said display unit, and wherein said selected part figures cover said portions of said other part figures on said display unit.

11. A figure drawing apparatus comprising:

input means for inputting a plurality of part figures and overlaying order data of said part figures, each of said part figures cover portions of other part figures;

memory means for storing said part figures being inputted by said input means and the overlaying order data;

selecting means for selectively retrieving said part figures and the overlaying order data from said memory means;

part figure memory means for storing said part figures and said overlaying order data retrieved by said selecting means;

a display unit for displaying said part figures;

drawing control means for determining an overlaying order in accordance with drawing rules of said selected part figures in accordance with the overlaying order data stored in said memory means and for drawing said selected part figures on said display unit in the overlaying order in accordance with said drawing rules; and part figure modifying means for modifying the overlaying order data corresponding to said selected part figures, and wherein said selected part figures cover said portions of said part figures.

12. A figure drawing apparatus according to claim 11, wherein said part figure modifying means comprises:

a figure generating unit for generating drawing data corresponding to said part figures;

a figure editing unit for editing said drawing data;

a drawing order modifying unit for modifying the drawing order data to draw said part figures;

a figure manipulating work memory for storing said drawing data;

a registering unit for transferring said drawing data from said figure manipulating work memory to said part figure memory means for registration;

a display image generating unit for generating image data corresponding to drawing orders indicative of said drawing data from said figure manipulating work memory, said drawing orders indicative of said order to draw said selected part figures; and a drawing unit for drawing said selected part figures in accordance with said drawing orders.

13. A figure drawing method comprising the steps of:

storing a plurality of figure menus for display;

selecting one of said stored figure menus;

displaying a plurality of part figures having overlaying order data and corresponding to said selected one of said stored figure menus;

selecting desired part figures from said plurality of part figures;

storing said selected desired part figures;

determining overlaying orders from said selected desired part figures to draw said selected desired part figures stored; and drawing said selected desired part figures in accordance with said overlaying orders, and wherein said selected desired part figures cover portions of other part figures in accordance with said overlaying orders.

14. A figure drawing method according to claim 13, further comprising the steps of:

checking if said selected part figures contain inputted drawing order data inputted by a user displaying a relevant message notifying the user if said inputted drawing order data is contained in said selected part figures and storing said drawing order data corresponding to said part figures if said inputted drawing order data is contained in said selected part figure; and clearing a display of said selected part figure before another selected part figures are drawn.

15. A figure drawing method according to claim 13, further comprising the steps of:

displaying drawing order data; and modifying said drawing order data.

* * * * *